(No Model.)

A. VAN HAAGEN.
CAKE OF SOAP.

No. 268,321. Patented Nov. 28, 1882.

Witnesses:
James F. Tobin.
David Williams

Inventor
Anthony van Haagen
by his attorneys
Howson and Son

United States Patent Office.

ANTHONY VAN HAAGEN, OF PHILADELPHIA, PA., ASSIGNOR OF ONE-HALF TO BENJAMIN BROOKE AND HENRY B. GROSS, BOTH OF SAME PLACE.

CAKE OF SOAP.

SPECIFICATION forming part of Letters Patent No. 268,321, dated November 28, 1882.

Application filed October 14, 1882. (No model.)

*To all whom it may concern:*

Be it known that I, ANTHONY VAN HAAGEN, a resident of Philadelphia, Pennsylvania, and a citizen of the United States, have invented an Improved Cake of Soap, of which the following is a specification.

My invention consists of a cake of soap made flat, or nearly so, at the top and bottom, and having rounded edges, in which are grooves or indentations affording lodgments for the fingers of the hand which grasps the cake, the form of the latter and its advantages being fully explained hereinafter.

Figure 1:
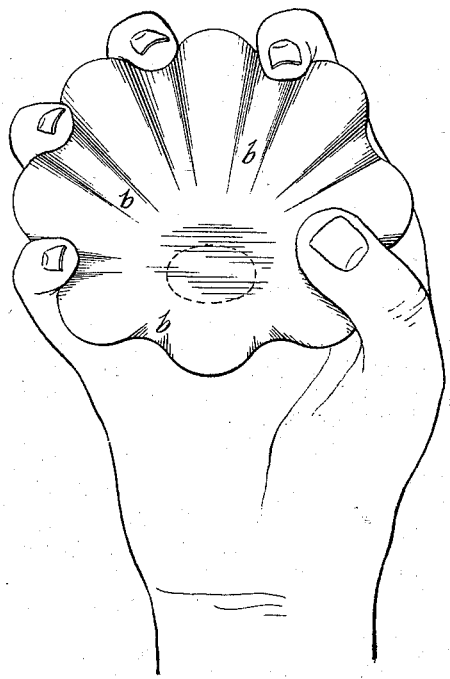
Figure 2:
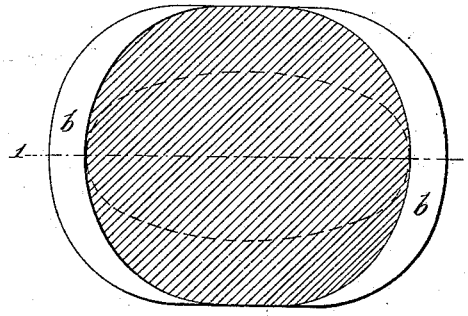

In the accompanying drawings, Figure 1 is a view of the cake of soap as it appears when grasped in the hand; Fig. 2, a sectional view of the cake; and Fig. 3, a sectional plan on the line 1 2, Fig. 2.

Figure 3:
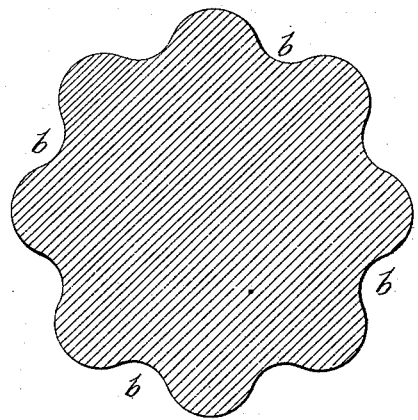

Cakes or blocks of soap have been made in the form of spheres, which, although possessing the advantage of presenting extended surfaces to the hands in washing the latter, have two disadvantages—first, the difficulty of holding the wet soap in one hand while rubbing it against the other, and, second, the fact that they are apt to roll away beyond easy reach when placed temporarily on any flat surface. In order to overcome the latter difficulty I make the cake of the form shown in Fig. 2—that is, in the shape of a sphere flattened on opposite sides. Perfect exactitude of shape, which might be designated by such a term as an "oblate spheroid," is not essential; but the cake should be flattened at the top and bottom, where it may be recessed, as indicated by the dotted line in Fig. 1, and rounded at the edges, as shown. These rounded edges are deeply indented at uniform intervals, so as to form a series of grooves, *b*, in which the fingers of the hand which grasps the cake can be lodged, as shown in Fig. 1. I thus obtain the extended surface so desirable in a cake of soap used for hand-washing, and at the same time afford the means of retaining the soap in one hand and preventing it from turning while it is being applied to the other hand. The cake, moreover, having flat top and bottom, will not roll away from the spot in which it is placed. The cake is in the present instance circular, as shown in Fig. 3; but this shape may be departed from, providing the edges are rounded and grooved. As the cake becomes reduced by repeated use there will be a reduction in the depth of the grooves, and the latter would finally disappear by the time the cake of soap represented in Fig. 2 had been reduced to the size indicated by dotted lines but for the fact that the soap is reduced within the grooves by washing, and that the repeated pressure of the fingers on the cake within the grooves tends to continue the latter beyond their original limits. The grooves, in fact, may be so deep in the first instance that they will not disappear until the cake has been so far reduced that it is not of sufficient size for convenient use.

I claim as my invention and as a new article of manufacture—

A cake of soap flat, or nearly so, at the top and bottom, and having rounded edges indented or grooved, as set forth.

In testimony whereof I have signed my name to this specification in the presence of two subscribing witnesses.

A. VAN HAAGEN.

Witnesses:
HARRY DRURY,
HUBERT HOWSON.